(12) United States Patent
Lee et al.

(10) Patent No.: US 10,407,801 B2
(45) Date of Patent: Sep. 10, 2019

(54) CARBON FIBER COMPOSITION INCLUDING GRAPHENE NANO-POWDER AND FABRICATION METHOD FOR CARBON FIBER USING THE SAME

(71) Applicant: KOREA INSTITUTE OF SCIENCE AND TECHNOLOGY, Seoul (KR)

(72) Inventors: Jae Kap Lee, Seoul (KR); Won Kook Choi, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 328 days.

(21) Appl. No.: 15/346,134

(22) Filed: Nov. 8, 2016

(65) Prior Publication Data

US 2017/0114478 A1 Apr. 27, 2017

Related U.S. Application Data

(62) Division of application No. 13/939,349, filed on Jul. 11, 2013, now abandoned.

(30) Foreign Application Priority Data

Jul. 13, 2012 (KR) ........................ 10-2012-0076759

(51) Int. Cl.
| | |
|---|---|
| *D01F 9/22* | (2006.01) |
| *C08K 5/20* | (2006.01) |
| *C08K 3/04* | (2006.01) |
| *C08K 7/06* | (2006.01) |
| *D01F 9/145* | (2006.01) |
| *D01F 9/16* | (2006.01) |
| *B82Y 30/00* | (2011.01) |
| *C01B 32/20* | (2017.01) |
| *C01B 32/184* | (2017.01) |
| *B82Y 40/00* | (2011.01) |

(52) U.S. Cl.
CPC .............. *D01F 9/225* (2013.01); *B82Y 30/00* (2013.01); *C01B 32/184* (2017.08); *C01B 32/20* (2017.08); *C08K 3/04* (2013.01); *C08K 3/043* (2017.05); *C08K 5/20* (2013.01); *C08K 7/06* (2013.01); *D01F 9/145* (2013.01); *D01F 9/16* (2013.01); *D01F 9/22* (2013.01); *B82Y 40/00* (2013.01); *C01P 2004/17* (2013.01); *D10B 2101/12* (2013.01); *Y10S 977/734* (2013.01); *Y10S 977/842* (2013.01)

(58) Field of Classification Search
CPC . C08K 5/20; C08K 7/06; C08K 3/043; C08K 3/04; D01F 9/145; D01F 9/16; D01F 9/22; D01F 9/225; B82Y 40/00; B82Y 30/00; C01B 32/20; C01B 32/184; Y10S 977/842; Y10S 977/734; C01P 2004/17; D10B 2101/12
USPC ........................................................ 524/356
See application file for complete search history.

(56) References Cited

U.S. PATENT DOCUMENTS 8,519,045 B2    8/2013    Jang et al.

FOREIGN PATENT DOCUMENTS

| CN | 102534870 A | 7/2012 |
|---|---|---|
| JP | 2002-146635 A | 5/2002 |
| KR | 1020100099586 A | 9/2010 |
| KR | 101040967 B1 | 6/2011 |
| KR | 10-1074027 B1 | 10/2011 |
| KR | 10-1156671 B1 | 6/2012 |
| WO | 2010/107762 A1 | 9/2010 |

OTHER PUBLICATIONS

Chan Kim; "Fabrications and Microstructural Characterizations of Multi-phase Carbon Nanofibers", J. of Future Fusion Technology, vol. 1, No. 1, pp. 19-25; 2009.
I Mochida, et al; "Microstructure of Mesophase Pitch-Based Carbon Fiber and its Control", Carbon vol. 34, No. 8, pp. 941-956, 1996.
Korean Office Action dated Feb. 28, 2014; Appln. No. 10-2012-0076759.
USPTO RR dated Sep. 25, 2015 in connection with U.S. Appl. No. 13/939,349.
USPTO NFOA dated Jan. 22, 2016 in connection with U.S. Appl. No. 13/939,349.
USPTO FOA dated Jun. 13, 2016 in connection with U.S. Appl. No. 13/939,349.

*Primary Examiner* — Angela C Scott
(74) *Attorney, Agent, or Firm* — Ladas & Parry LLP

(57) ABSTRACT

The present disclosure relates to a carbon fiber composition and a fabrication method for high-performance carbon fiber using the same. The method can fabricate high-performance carbon fiber (or graphite fiber) with lowering a graphitization temperature by using graphene carbon fiber composition including nano-sized graphene.

9 Claims, 5 Drawing Sheets

CARBON FIBER COMPOSITION INCLUDING GRAPHENE NANO-POWDER AND FABRICATION METHOD FOR CARBON FIBER USING THE SAME

CROSS-REFERENCE TO RELATED APPLICATION

This application claims priority under 35 U.S.C. § 119(a) of Korean Patent Application No. 10-2012-0076759, filed on Jul. 13, 2012, in the Korean Intellectual Property Office. The entire disclosures of the earlier filed applications are incorporated herein by reference for all purposes.

BACKGROUND OF THE DISCLOSURE

1. Field of the Disclosure

The following description relates to a carbon fiber composition and a fabrication method for carbon fiber. The carbon fiber composition includes nano-sized graphene, and the fabrication method for carbon fiber also uses the same composition. Through the method, a graphitization temperature for fabrication of high-performance carbon fiber (or graphite fiber) can be lowered.

2. Background of the Disclosure

Carbon fiber is a fiber-type carbon material having a diameter of 10 μm or less, which can be categorized according to a starting material (or composition) and a fabrication method into polyacrylonitrile (PAN)-based carbon fiber, pitch-based carbon fiber, rayon-based carbon fiber, chemical vapor deposition (CVD)-based carbon fiber, etc.

The rayon-based carbon fiber was industrialized in 1963, and has been used as reinforcing fiber of a composite material in the various field, such as aerospace, etc. However, with the advent of PAN or pitch-based carbon fiber which can be manufactured at relatively-cheaper price, the production amount of the rayon-based carbon fiber has drastically decreased since 1978, and recently the production of the rayon-based carbon fiber has been actually stopped. Further, since the CVD-based carbon fiber has a problem of a low product yield, the PAN-based carbon fiber and the pitch-based carbon fiber are being mainly utilized in the carbon fiber-related industry.

Researches for enhancement of elastic modulus (elasticity) and strength of carbon fiber and for development of preparing method with lower costs, especially research on development of a new composition, is ongoing. As a method for enhancing physical property of carbon fiber, research on decrease of a diameter into sub micron (several hundred of nm) is also ongoing.

To prepare a high performance carbon fiber derived from PAN-based carbon fiber or pitch-based carbon fiber, a graphitization process should be performed at a very high temperature of about 2,500° C. or greater during the preparation process. Also, some kind of carbon fiber may be fabricated through a carbonization process at a temperature of about 800° C.~1,500° C. only. However, in this case, the fabricated carbon fiber has lower performance than the high performance carbon fiber as mentioned above.

Since high-performance carbon fiber undergoes a graphitization process, it can be mentioned so-called "material of graphite structure". Practically, it is reported that carbon fiber is composed of graphite ribbon (sheet-like, bent shaped, or loop shaped ones) [I. Mochida et al., Microstructure of mesophase pitch-based carbon fiber and its control, Carbon 34 (1996) 941-956 (FIG. 4); Chan Kim, Fabrications and Microstructural Characterizations of Multi-phase Carbon Nanofibers, J. of Future Fusion Technology 1 (2009) 19-25 (FIG. 9)]. The sheet-like graphite has a thickness of about 5-10 nm and a width of several μm, and the carbon fiber has a diameter of 10 μm or less.

Recently, graphene has attracted much attention. Graphene is a two-dimensional carbon material consisting of carbon atom with single layer having a thickness of about 0.4 nm. Since graphene is a basic unit of graphite (i.e., graphite is a stacked body with a plurality of graphene, it can be fabricated in the form of powder by decomposing graphite. Graphene powder can be defined as an accumulation of three-dimensionally random graphene layers.

Considering that a particle size of graphite is several μm, it may be understood that graphene powder obtained by decomposing the graphite have an average size of several nm~several μm. However, an actual size of the graphene powder is a nano scale (1-100 nm).

Recently, the inventors of this disclosure have proposed a method for fabricating graphene powder by mechanical decomposing helical AA' graphite (graphene helix stacked body) (Korean Registration Patent No. 10-1040967). Here, the graphene has a width of 5 nm or less than, a length of 20 nm or less than, and a thickness of carbon atoms to pure graphene of 0.4 nm.

Generally, carbon fiber and graphite fiber are considered to be the same meaning. However, carbon fiber and graphite fiber indicate fiber having undergone a heating process at 800° C.~1,500° C. and fiber having undergone a graphitization process at 2,500° C. or more, respectively. Among carbon fibers used in the industry, high-performance carbon fiber of an excellent physical property (tensile modulus of about 350 GPa or more) means fiber having undergone a graphitization process at 2,500° C. or more. Through the conventional method of fabrication carbon fiber, it is impossible to lower a graphitization temperature for fabricating such high-performance carbon fiber, including PAN-based carbon fiber and pitch-based carbon fiber.

In the conventional art, there has been reports on technique of graphene composite nano (carbon) fiber. Here the graphene material is thin graphite having a thickness of about ~10 nm, rather than graphene (referred to as 'single-layered graphene' or 'multi-layered graphene') [Sung-Yeon Jang et al., Graphene composite nanofiber and the preparation method thereof, Publication No. 10-2010-0099586].

SUMMARY OF THE DISCLOSURE

Therefore, an aspect of the detailed description is to provide a graphene carbon fiber composition capable of fabricating high-performance carbon fiber with lowering a graphitization temperature.

Another aspect of the detailed description is to provide a method for fabricating high-performance graphene carbon fiber, capable of performing an excellent graphitization process at a temperature lower than the conventional one, using the graphene carbon fiber composition.

To achieve these and other advantages and in accordance with the purpose of this specification, as embodied and broadly described herein, there is provided a graphene carbon fiber composition, comprising: a composition for fabricating carbon fiber; and graphene powder, wherein the graphene powder serves as a seed of graphite to be formed during carbon fiber fabricating processes.

The composition for fabricating carbon fiber includes one selected from the group consisting of polyacrylonitrile (PAN)-based carbon fiber, pitch-based carbon fiber, rayon-based carbon fiber and combinations thereof.

To achieve these and other advantages and in accordance with the purpose of this specification, as embodied and broadly described herein, there is also provided a method for fabricating high-performance carbon fiber, the method comprising steps of: a mixing step to fabricate a graphene suspension by mixing a composition for fabricating carbon fiber with graphene powder to form a graphene carbon fiber composition, and dispersing the graphene carbon fiber composition in a solvent, wherein the composition for fabricating carbon fiber includes one selected from the group consisting of polyacrylonitrile (PAN)-based carbon fiber, pitch-based carbon fiber, rayon-based carbon fiber and combinations thereof; a fabrication step to fabricate fibers by controlling a viscosity of the graphene suspension and performing a fiberization process of the graphene suspension; a stabilization step to stabilize the fibers; and a heat treatment step of fabricating nano ribbon-shaped graphite by graphitization the stabilized the fibers at a temperature less than 2,500° C.

The graphene powder included in the graphene carbon fiber composition serves as a seed of graphite to be formed during high-performance carbon fiber fabricating processes.

In the present invention, high-performance carbon fiber indicates carbon fiber having an excellent physical property (tensile modulus of about 350 GPa or more than), and may be fabricated by undergone a graphitization process at a temperature of 2,500° C. or more. The high-performance carbon fiber is differentiated from general carbon fiber which can be obtained through a heating process at 800° C.~1,500° C. The high-performance carbon fiber may be referred to as 'graphite fiber', but will be referred to as high-performance carbon fiber in the present invention.

Hereinafter, the present invention will be explained in more detail.

The graphene carbon fiber composite comprises a composition for fabricating carbon fiber and graphene powder.

The composition for fabricating carbon fiber includes one selected from the group consisting of PAN-based carbon fiber, pitch-based carbon fiber, rayon-based carbon fiber and a combination thereof.

In order to fabricate high-performance carbon fiber using the composition, a graphitization process should be performed at a high temperature of 2,500° C. or more, which may require a high cost.

However, since the graphene carbon fiber composition comprises graphene powder, a graphitization process can be performed at a temperature of 2,500° C. or less. Further, high-performance carbon fiber can be fabricated through a graphitization process at a temperature of about 2,000° C.

The pitch may be anisotropic or isotropic pitch. In a case where the composition for fabricating carbon fiber includes anisotropic pitch, a fabrication temperature may be relatively high, because the anisotropic pitch has a high molecular amount and a high softening temperature.

The graphene powder has a thickness of about 0.4 nm, and its lateral dimensions are 3~100 nm (generally 5~20 nm). The graphene powder may be agglomerated due to Van der Waals force. However, generally, the graphene powder may seem to have a structure that graphene sheets are stacked in parallel to one another.

The graphene carbon fiber composition may be dispersed in a solvent. The dispersion may be performed using ultrasonication treatment, etc. As the solvent, it may be used any solvent capable of properly dispersing the graphene carbon fiber composition. More specifically, the solvent may be one selected from the group consisting of alcohol, acetone, dimethylformamide (DMF), tetrahydrofuran (THF) and combinations thereof. The graphene carbon fiber composition may further comprise a viscosity control agent, a solvent, a solidification liquid, etc.

Based on 100 wt % of the sum of the composition for fabricating carbon fiber and the graphene powder, the weight of the graphene powder may be more than 0.1 wt %, or may be in the range of more than 0.1 wt % and 50 wt % or less. If the weight of the graphene powder is more than 0.1 wt % based on 100 wt % of the sum of the composition for fabricating carbon fiber and the graphene powder, a graphitization temperature for fabricating high-performance carbon fiber can be performed at a temperature lower than 2,500° C.

Based on 100 wt % of the sum of the composition for fabricating carbon fiber and the graphene powder, the weight of the graphene powder may be 0.5 wt % or more, or may be 0.5-50 wt %. If the weight of the graphene powder is 0.5 wt % or more than, based on 100 wt % of the sum of the composition for fabricating carbon fiber and the graphene powder, a graphitization temperature for fabricating high-temperature carbon fiber may be performed at a temperature lower than 2,500° C., at a temperature of at least 1,500° C.~2,500° C., or at a temperature of 1,500° C.~2,000° C.

The graphene carbon fiber composition may lower a graphitization temperature for fabricating high-performance carbon fiber, by comprising nano-sized graphene powder. It is believed that this results from that the graphene powder serves as a seed of nano ribbon-shaped graphite to be formed during a graphitization process. Considering that the formed nano ribbon-shaped graphite has a size (length) of several tens of nm, it may be advantageous that the graphene powder serving as a seed has a size less than 10 nm.

A fabrication method for high-performance carbon fiber according to another embodiment of this disclosure, comprises steps of a mixing step and a heat treatment step.

The mixing step includes a step of fabricating a graphene suspension by mixing a composition for fabricating carbon fiber with graphene powder to form a graphene carbon fiber composition, and dispersing the graphene carbon fiber composition in a solvent. The composition for fabricating carbon fiber included one selected from the group consisting of polyacrylonitrile (PAN)-based carbon fiber, pitch-based carbon fiber, rayon-based carbon fiber and combinations thereof.

The configuration and characteristics of the composition for fabricating carbon fiber and the graphene powder is the same as was explained in the above, it is therefore omitted herein.

The graphene powder may be fabricated by decomposing a crystalline graphite structure (commonly in a mechanical route). The crystalline graphite structure may have grown in a helix shape. With the mechanical route, mass production of graphene powder is possible.

The graphene suspension may be fabricated by dispersing the graphene carbon fiber composition in a solvent in a dispersed state. The solvent was aforementioned with the graphene carbon fiber composition according to the above, and thus its detailed explanations will be omitted in here. The graphene suspension may be dispersed using ultrasonication, etc. within the mixing step.

The prepared graphene suspension may be fabricated as carbon fiber through a fiberization step, a stabilization step and a graphitization step (a heat treatment step).

The fiberization step may be performed after controlling a viscosity of the graphene suspension. Graphene carbon fiber may be fabricated in the form of continuous fiber, staple fiber, fabrics, etc., according to a usage purpose.

The stabilization step may be performed by maintaining the fiber fabricated during the fiberization step, in an oven for about 3 hours, under an oxidation atmosphere kept at about 200° C.~400° C.

The graphitization step (the heat treatment step) may be performed by putting the stabilized fiber into a furnace, under an atmosphere of inactive gas (nitrogen, argon), and then by performing a heat treatment process. The graphitization process may be performed at a temperature less than 2,500° C., at a temperature of at least 1,500° C.~2,500° C., or at a temperature of 1,500° C.~2,000° C.

If the graphitization process is performed within the above temperature range, graphitization may be performed at a temperature lower than the conventional graphitization temperature for fabricating high-performance carbon fiber. Here, graphite fiber (high-performance carbon fiber), which has the same performance or more excellent performance as/than the conventional one fabricated at a high temperature, can be provided.

With the graphene carbon fiber composition according to the present disclosure, high-performance carbon fiber can be fabricated at a lower graphitization temperature than the conventional one for fabricating high-performance carbon fiber.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Example 1

1-1) Fabrication of Graphene Nanopowder

Nano-sized graphene powder was fabricated by mechanical milling (decomposing) helical crystalline graphite structure (diameter: several tens of nm, length: several μm).

Figure 1:
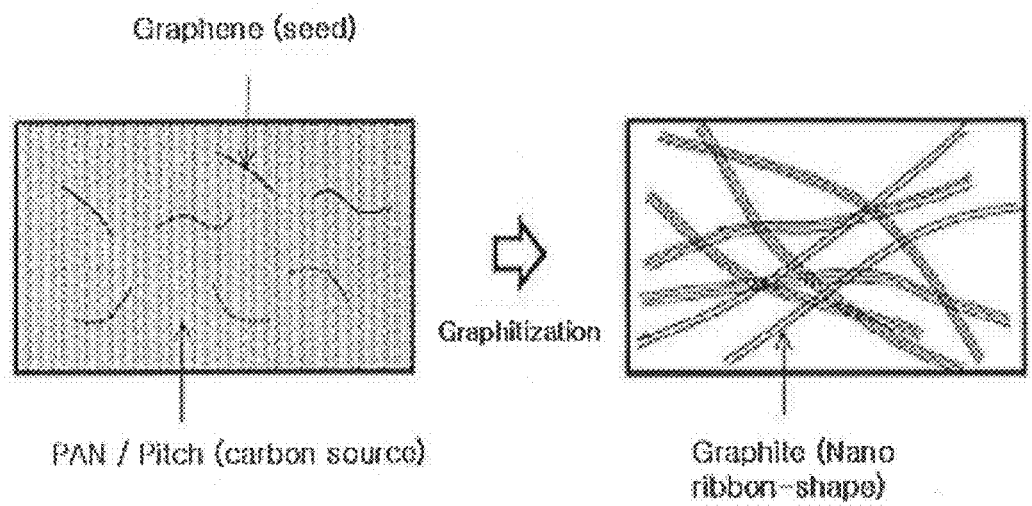
FIG. 1 is a conceptual view illustrating a graphene carbon fiber composition according to an embodiment of the present invention, and nano ribbon-shaped graphite obtained by heat-treatment (graphitization) the graphene carbon fiber composition.
Figure 2:
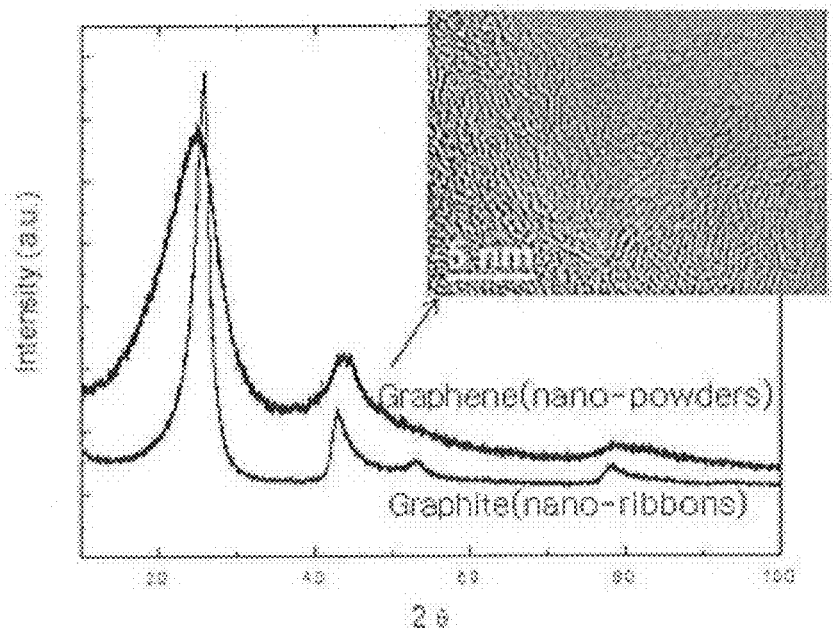
FIG. 2 illustrates a high-resolution transmission electron microscopy (HRTEM) image (upper side on the right) of graphene powder fabricated in Example 1-1), an X-ray diffraction (XRD) pattern of graphene powder, and an XRD pattern of nano ribbon-shaped graphite after a graphitization process, in which full with half maximum (FWHM) of the (002) peak which near 26° (2θ) are 7.9° and 2.6°, respectively.

An XRD analysis result on the graphene powder was shown in FIG. 2, and an HRTEM image of the graphene powder was shown on the upper right corner of FIG. 2.

Referring to FIG. 2, (002) peak of an XRD pattern appears to be broadened, and an HRTEM image reveals disordered graphene layers although some of them are stacked in parallel. Graphene sheets have a length of 10 nm or less than and a thickness of 0.4 nm or less than The data prove that the sample was graphene in the form of a nanopowder.

1-2) Fabrication of Graphene Carbon Fiber Composition 0.2 g of the graphene powder fabricated according to Example 1-1) was put in 10 cc of dimethylformamide (DMF), and the mixture underwent an ultrasoncation, thereby fabricating a graphene suspension formed as the graphene was dispersed into the DMF.

1.8 g of polyacrylonitrile (PAN, manufactured by Aldrich Co., Ltd., weightaverage molecular weight: 150, 000) and 100 cc of DMF were mixed to each other, thereby fabricating a PAN solution (composition for fabricating carbon fiber). The graphene suspension and the PAN solution were mixed to each other, and the mixture underwent ultrasonication, thereby fabricating a graphene suspension, a liquid-phase PAN-based graphene carbon fiber composition (the amount of graphene powder was 10 wt % based on the sum (PAN+graphene powder)). The graphene carbon fiber composition of the present invention may be prepared in the form of the graphene suspension, or a material formed as the graphene suspension has a prescribed viscosity, or particles formed after the graphene suspension is dried, etc.

Figure 3A:
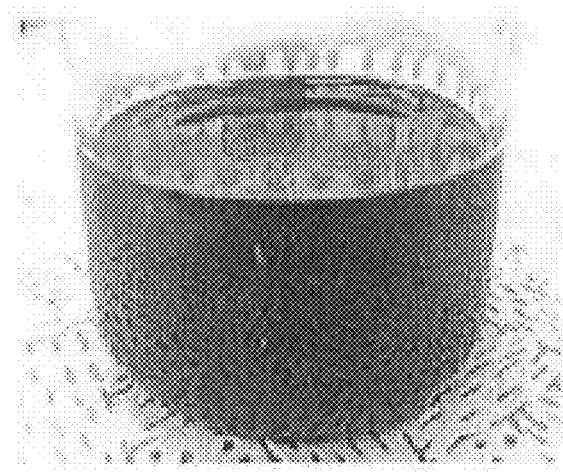
FIG. 3(A) (left) is an image illustrating a graphene suspension, a liquid-phase PAN-based graphene carbon fiber composition fabricated according to Example 1 (weight of graphene based on the sum of PAN and graphene powder: 10 wt %), and FIG. 3 (B) (right) is an image illustrating the graphene suspension according to Example 1 in the form of powder through a drying process and a granulation process.

FIG. 3(A) (left) is an image illustrating a graphene suspension, a liquid-phase PAN-based graphene carbon fiber composition according to Example 1 (weight of graphene based on the sum of PAN and graphene powder: 10 wt %). Referring to FIG. 3(A), the graphene suspension exhibited a uniform black color differently from a transparent PAN solution. From this, it was proved that the graphene powder was uniformly dispersed in the PAN solution.

1-3) Heat Treatment of Graphene Carbon Fiber Composition

Figure 3B:
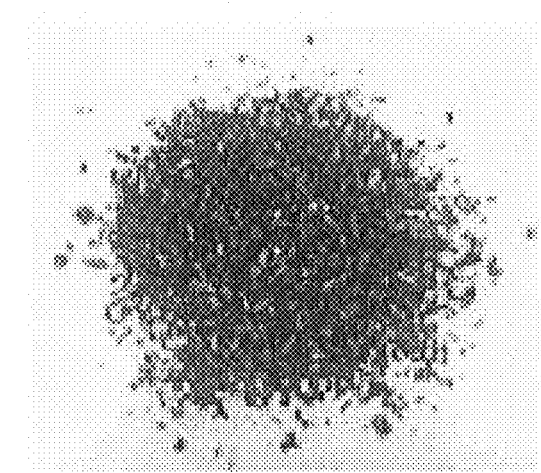

For heat treatment of a graphene carbon fiber composition, the graphene suspension was dried in an oven to be granulated. As a result, fabricated was a powder-type graphene carbon fiber composition shown in FIG. 3(B). In case of fabricating graphene carbon fiber, such process is not required, but a suspension viscosity controlling process and a fiberization process are required. Prior to the heat treatment, the graphene carbon fiber composition was stabilized at 300° C. for 3 hours.

The stabilized sample was put into a vacuum furnace, and then was heated (graphitization process) at a temperature of 2,000° C.

An XRD analysis result on the thermally-treated sample was shown in the lower graph of FIG. 2. Referring to FIG. 2, (002) peak was clearly observed near 26° (2θ). From this, it was proved that the graphene carbon fiber composition was graphitized.

Figure 4A:
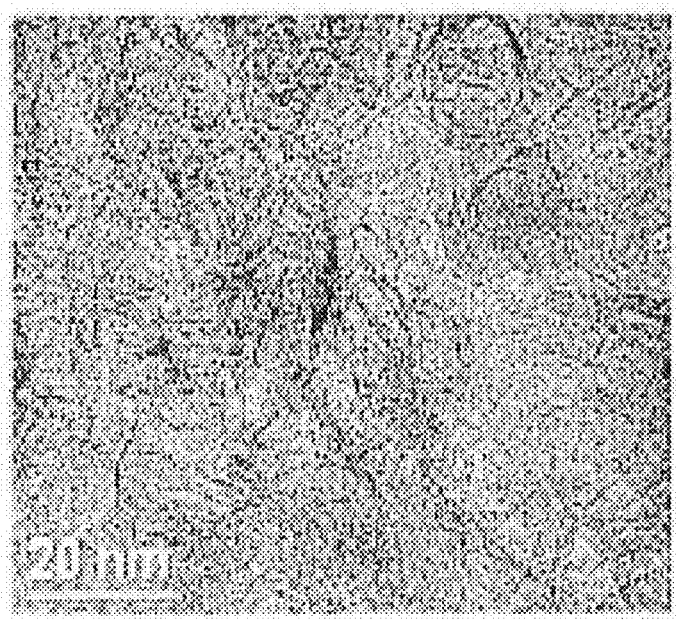
FIG. 4(A) (left) is a transmission electron microscopy (TEM) image illustrating nano ribbon-shaped graphite fabricated according to Example 1, and FIG. 4(B) (right) illustrates a TEM analysis result on nano ribbon-shaped graphite fabricated according to Example 3.
Figure 5A:
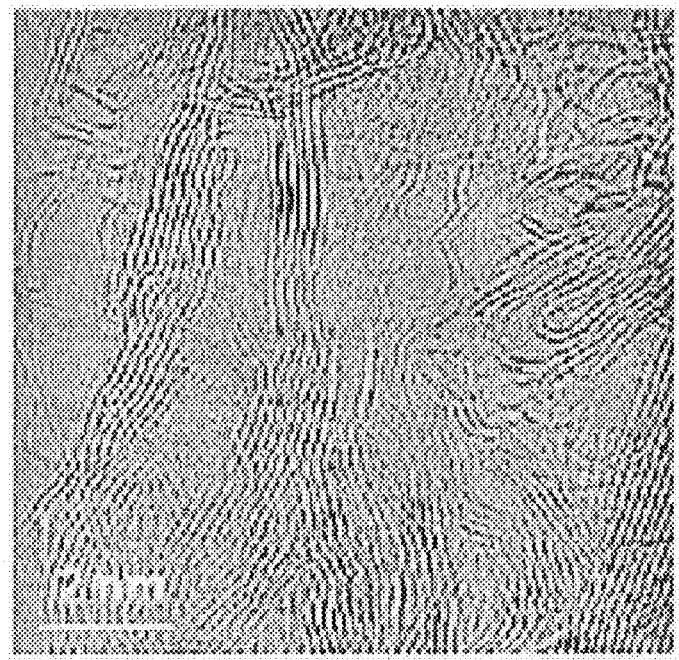
FIG. 5(A) (left) is a transmission electron microscopy (TEM) image illustrating nano ribbon-shaped graphite fabricated according to Example 1, and FIG. 5(B) (right) illustrates a TEM analysis result on nano ribbon-shaped graphite fabricated according to Example 3.

The graphitized sample was analyzed using high-resolution transmission electron microscopy (HRTEM), and an image thereof was shown in FIGS. 4(A) and 5(A). Referring to FIGS. 4(A) and 5(A), nano ribbon-shaped graphite having a thickness of several nm or less than, and a length of several tens of nm is observed.

Comparative Example 1

A PAN carbon fiber composition fabricated in the same manner as in Example 1, except that graphene powder was not included, was stabilized at 300° C. for 3 hours. Then, the PAN carbon fiber composition underwent a graphitization process at a temperature of 2,000° C. for 1 minute.

Figure 6:
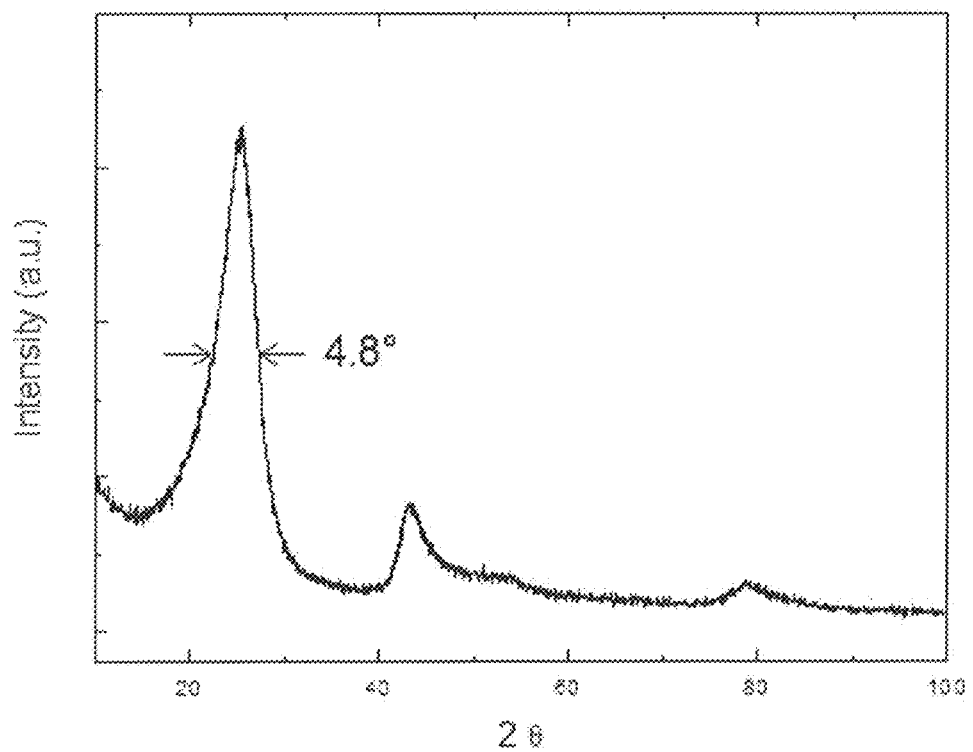
FIG. 6 illustrates that a sample not including graphene powder has been thermally-treated, in which full with half maximum (FWHM) of (002) peak shown near 26° (2θ) is 4.8°.

As shown in FIG. 6, full with half maximum (FWHM) of (002) peak was 4.8°, which was much greater than 2.8° shown in FIG. 2 where the PAN-based carbon fiber composition includes graphene powder. This means that graphite is not well formed in a case where the PAN-based carbon fiber composition does not include graphene nano powder. From this, it can be proved that the graphene powder of the present invention serves as a seed in a process of fabricating graphene carbon fiber.

Example 2

In Example 1, experiments were conducted on a change of formation behavior of nano ribbon-shaped graphite, according to a change of the amount of graphene with respect to PAN, when fabricating the graphene carbon fiber composition of Example 1-2) using the graphene nano powder of Example 1-1). The content of the graphene powder was lowered to 0.1 wt % from 10 wt %, and the result was shown in the following Table 1.

When the content of graphene powder based on the sum of PAN and graphene in the graphene suspension is 0.5 wt % or more than, the sample exhibited an entirely opaque black color. However, the sample was gradually diluted when the content of graphene powder is 0.4 wt % or less than. Then, the sample exhibited a semi-transparent black color when the content of graphene powder is 0.1 wt %.

Each graphene suspension was dried, and underwent the same process as in Example 1-3). The resulting materials were analyzed using XRD and TEM, and the degree of graphitization with respect to each sample was shown in Table 1. In a case where the nano ribbon-shaped graphite was well formed (FWHM of (002) peak using XRD was 4.5° or less), it was expressed as 'Excellent'. On the other hand, in a case where the nano ribbon-shaped graphite was not well formed (FWHM of (002) peak using XRD was 4.5° or more), it was expressed as 'Inferior'.

TABLE 1

| | Content of Graphene Powder (wt %) | Content of PAN (wt %) | Degree of Formation of Nano Ribbon-Shaped Graphite |
|---|---|---|---|
| Example 2-1 | 10 | 90 | Excellent |
| Example 2-2 | 1.0 | 99.0 | Excellent |
| Example 2-3 | 0.5 | 99.5 | Excellent |
| Example 2-4 | 0.1 | 99.9 | Inferior |

Referring to the above Table 1, in a case where each sample was dried to undergo a graphitization process at 2,000° C., graphitization was performed when the amount of graphene powder is more than 0.1 wt %. Also, graphitization was excellently performed when the amount of graphene powder is 0.5 wt % or more than. On the other hand, the seed effect of the present invention was not observed when the amount of graphene powder is 0.1 wt % or less than.

From the above experiments, it could be proved that the content of graphene powder added to a graphene carbon fiber composition should be more than 0.1 wt %, preferably 0.5 wt % or more than, for fabrication of nano ribbon-shaped graphite when a graphitization temperature is 2,000° C. This means that the content of graphene powder added to a graphene carbon fiber composition is preferably about 0.5 wt % or more than. However, the lower limit may be much lower than 0.1 wt %, according to an experimental method, an optimization of experimental conditions, etc.

Example 3

A pitch-based graphene carbon fiber composition was fabricated using the nano-sized graphene powder fabricated in Example 1-1), and using anisotropy pitch (manufactured by Donga Carbon Fiber Co., Ltd.) rather than the PAN of Example 1-2). Suspension was mixed with the anisotropy pitch. The content of the graphene powder was 10 wt % based on the sum of the anisotropy pitch and the graphene powder, in the same manner as in Example 1.

The pitch-based graphene carbon fiber composition underwent a stabilization process and a graphitization process, in the same manner as in Example 1.

Figure 4B:
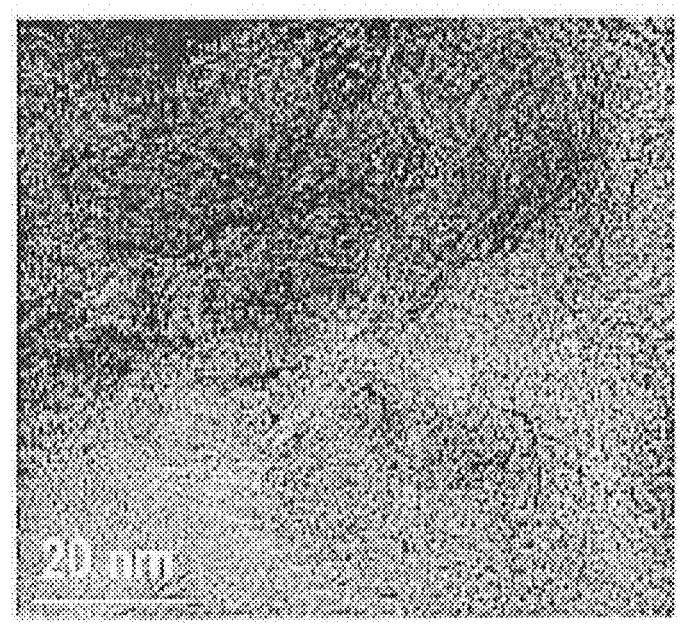
Figure 5B:
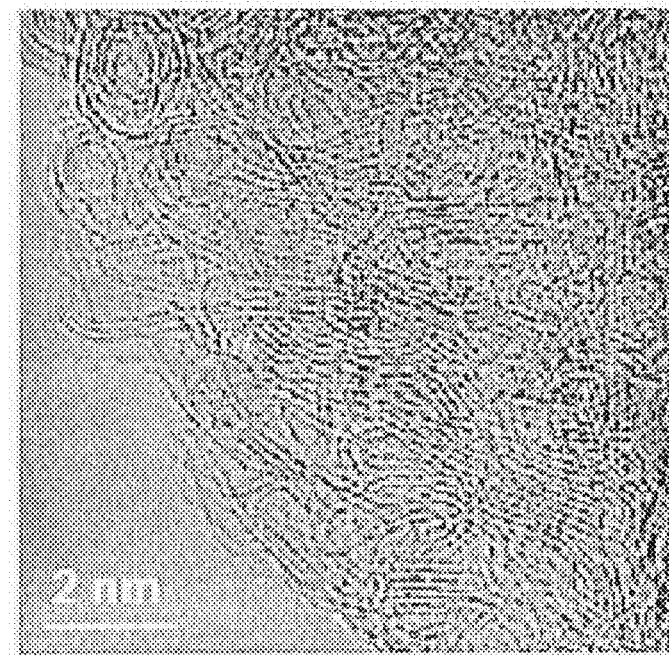

The experimental results obtained in Example 3 were similar to those in Example 1. As shown in the TEM images of FIGS. 4(B) and 5(B), observed was nano ribbon-shaped graphite having a thickness of several nm or less than, and a length of several tens of nm. Further, as an XRD analysis result at (002) peak (FWHM: 3° or less than) was clearly observed near 26° C. (2θ) in the same manner as in Example 1. This means that high-performance carbon fiber can be fabricated at 2,000° C. if nano-sized graphene is added to a graphene carbon fiber composition, in case of pitch-based carbon fiber.

Referring to the results obtained in Examples and Comparative Example, in the examples where graphene powder was added to a graphene carbon fiber composition, a graphitization process was excellently performed even at a temperature of 2,000° C. This means that high-performance carbon fiber can be fabricated at a temperature of 2,000° C. lower than the conventional 2,500° C. or more than by about 500° C.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A method for fabricating high-performance carbon fiber, the method comprising steps of:
    a mixing step to make a graphene carbon fiber composition by mixing a composition for fabricating carbon fiber, and graphene powder, wherein the composition for fabricating carbon fiber includes one selected from the group consisting of, pitch, rayon and combinations thereof; and
    a heat treatment step of the graphene carbon fiber composition, and
    wherein the graphene powder serves as a seed of nanoribbon-shaped graphite to be formed during carbon fiber fabricating processes.

2. The method of claim 1, wherein the graphene powder is fabricated by decomposing crystalline graphite, and has a particle size of 20 nm or less.

3. The method of claim 2, wherein the crystalline graphite is a graphite structure grown in a helix shape.

4. The method of claim 1, wherein a content of the graphene powder is more than 0.1 wt % based on 100 wt % of the sum of the composition for fabricating carbon fiber and the graphene powder.

5. The method of claim 1, the mixing step further comprising a solvent, wherein the solvent is selected from the group consisting of alcohol, acetone, dimethylformamide (DMF), tetrahydrofuran (THF) and combinations thereof.

6. The method of claim 1, wherein the composition for fabricating carbon fiber further includes polyacrylonitrile (PAN).

7. A method for fabricating high-performance carbon fiber, the method comprising steps of:
    a mixing step to fabricate a graphene suspension by mixing a composition for fabricating carbon fiber with graphene powder to form a graphene carbon fiber composition, and dispersing the graphene carbon fiber composition in a solvent, wherein the composition for fabricating carbon fiber includes one selected from the group consisting of, pitch, rayon and combinations thereof;
    a fabrication step to fabricate mixed-fiber by controlling a viscosity of the graphene suspension and performing a fiberization process of the graphene suspension;
    a stabilization step to stabilize the fibers by heating at 200~400° C. under atmosphere; and
    a heat treatment step of fabricating nano ribbon-shaped graphite by graphitization of the stabilized fibers at a temperature less than 2,500° C.,
    wherein the graphene powder included in the graphene carbon fiber composition serves as a seed of graphite to be formed during high-performance carbon fiber fabricating processes.

8. The method of claim 7, wherein the graphitization of the heat treatment step is performed at a temperature in the range of 1,500° C. and greater to less than 2,500° C.

9. The method of claim 7, wherein the composition for fabricating carbon fiber further includes polyacrylonitrile (PAN).

* * * * *